US012709355B2

(12) United States Patent
Chan

(10) Patent No.: US 12,709,355 B2
(45) Date of Patent: Aug. 18, 2026

(54) BICYCLE DRIVING SYSTEM AND KIT

(71) Applicant: CYC MOTOR LTD., Hong Kong (CN)

(72) Inventor: Wan Hong Chan, Hong Kong (CN)

(73) Assignee: CYC Motor Ltd., Hong Kong (CN)

( * ) Notice: Subject to any disclaimer, the term of this patent is extended or adjusted under 35 U.S.C. 154(b) by 975 days.

(21) Appl. No.: 17/638,886

(22) PCT Filed: Aug. 27, 2020

(86) PCT No.: PCT/IB2020/057994

§ 371 (c)(1), (2) Date: Feb. 28, 2022

(87) PCT Pub. No.: WO2021/038476

PCT Pub. Date: Mar. 4, 2021

(65) Prior Publication Data

US 2022/0306239 A1 Sep. 29, 2022

Related U.S. Application Data

(60) Provisional application No. 62/893,323, filed on Aug. 29, 2019.

(51) Int. Cl.

*B62M 6/55* (2010.01)
*B62J 45/411* (2020.01)

(Continued)

(52) U.S. Cl.

CPC .............. *B62M 6/55* (2013.01); *B62J 45/411* (2020.02); *B62J 45/412* (2020.02); *B62J 45/421* (2020.02); *B62M 6/50* (2013.01); *F16H 37/02* (2013.01)

(58) Field of Classification Search

CPC . B62M 6/55; B62M 6/50; F16H 37/02; F16H 2003/0818; F16H 1/32; B62J 45/421; B62J 45/412; B62J 45/411

(Continued)

(56) References Cited

U.S. PATENT DOCUMENTS 5,512,022 A * 4/1996 Suzuki ...................... B60L 7/14 475/2
5,603,388 A * 2/1997 Yaguchi ................... B62M 6/55 180/206.3

(Continued)

FOREIGN PATENT DOCUMENTS

KR 200328321 Y1 * 9/2003 .............. B62M 6/55
TW M483912 U * 8/2014 ............ B62M 3/003

OTHER PUBLICATIONS

Translation of TW M483912 U (Year: 2024).*

(Continued)

*Primary Examiner* — John Olszewski
*Assistant Examiner* — Nathaniel William Watkins

(57) ABSTRACT

The invention discloses a bicycle drive system (10) and a kit. The drive system comprises a drive unit (15) comprising a housing, a motor unit (20) having a stator (21), a rotor (22) and an output shaft and accommodated in the housing, and a first stage deceleration unit (30) having an input part connected to the output shaft of the motor unit and an output part; a mounting unit (50) configured to secure and hold the drive unit on a bicycle body (70); and a second stage deceleration unit (40) arranged external to the drive unit and detachably mounted on the first stage deceleration unit for connection to a pedal assembly (80). The drive unit, the mounting unit and the second stage deceleration unit are each provided as a modular part for assembling to the bicycle.

19 Claims, 7 Drawing Sheets

(51) Int. Cl.
*B62J 45/412* (2020.01)
*B62J 45/421* (2020.01)
*B62M 6/50* (2010.01)
*F16H 37/02* (2006.01)

(58) Field of Classification Search
USPC ........................................................ 180/206.3
See application file for complete search history.

(56) References Cited

U.S. PATENT DOCUMENTS 5,915,493 A * 6/1999 Nakayama ............... B62M 6/50 180/220
6,412,800 B1 * 7/2002 Tommei ................... B62M 6/55 280/220
2011/0303474 A1 * 12/2011 Kimmich ................. B62M 6/55 180/206.3
2015/0122565 A1 * 5/2015 Deleval .................... B62M 6/55 180/206.3
2017/0137087 A1 * 5/2017 Watarai .................... B62M 6/55
2017/0183061 A1 * 6/2017 Yamamoto ........... B62M 11/145

OTHER PUBLICATIONS

Merged copy of original document with paragraphs numbers added (KR-20328321) (Year: 2025).*
English Translation of TW-M483912 (Year: 2025).*
Merged copy of original document with English translation (KR-200328321); Paragraphs added. (Year: 2025).*
Merged copy of original document (ES-1063923); Paragraphs added for citations. (Year: 2025).*

* cited by examiner

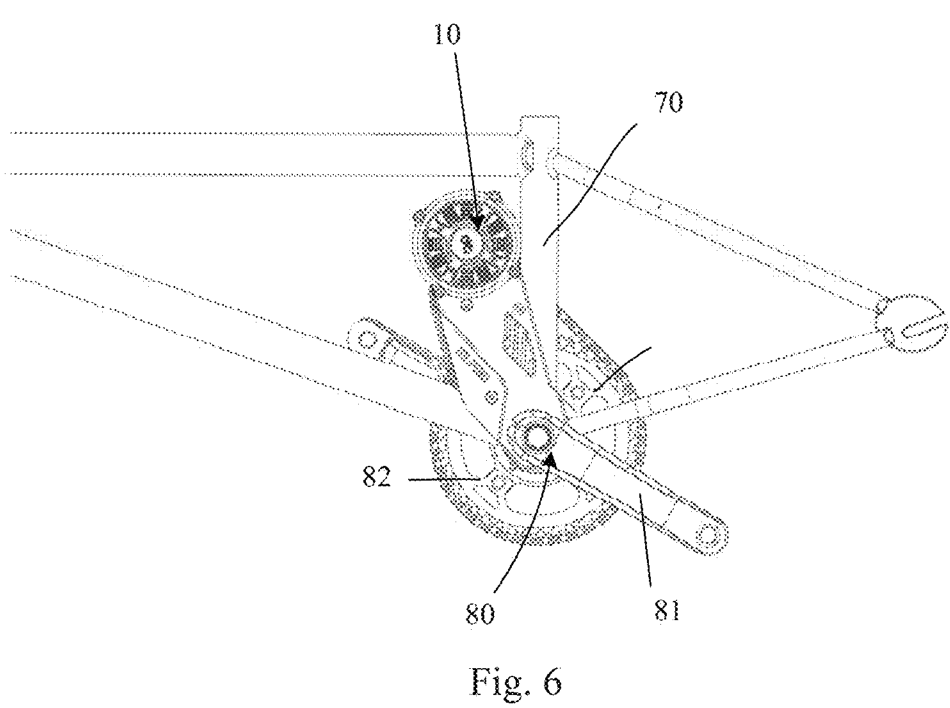
Fig. 6
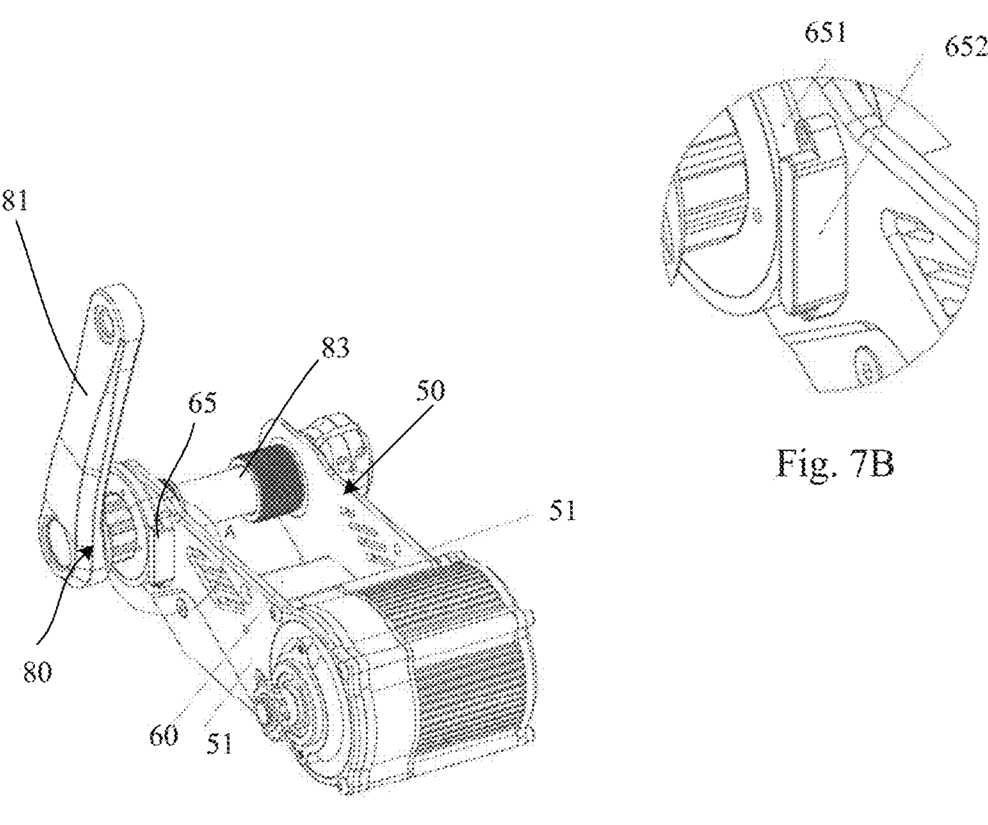
Fig. 7B
Fig. 7A

BICYCLE DRIVING SYSTEM AND KIT

FIELD OF THE INVENTION

The invention relates to a bicycle drive system capable of providing power for a bicycle or providing for example a pedal assembly with power assist.

BACKGROUND OF THE INVENTION

In recent years, an auxiliary drive system to aid in providing an electric drive force for a bicycle has been developed to lessen physical exertion of a rider. The auxiliary drive system comprises an auxiliary mid-drive system configured to drive a pedal assembly of a bicycle, particularly to drive chainrings of the pedal assembly driven by a crank to transmit the drive force to bicycle wheels via a chain connected to the chainrings to provide the auxiliary drive, whereby to achieve the aim of saving stamina of the rider.

A typical and common shortcoming of the existing auxiliary mid-drive system of the bicycle consists in that the dimensions of a motor are too large and the clearance between the motor and the bottom bracket shell of the bicycle is relatively small. This leads to a number of problems, including insufficient ground clearance after the mounting of the auxiliary mid-drive system to the bicycle bottom bracket and poor compatibility between different types and shapes of bicycle frame and the auxiliary mid-drive system. The limited orientation of mounting the auxiliary mid-drive system on the bottom bracket of the bicycle frame is usually caused by the shape of the motor unit. In particular, when the auxiliary mid-drive system is applied to a mountain bike, a high ground clearance between the auxiliary mid-drive system and the ground is required.

Another problem is that different bicycle frames of the prior art have different types of spindle (i.e. a turning part for connecting a left crank and a right crank in the bicycle frame, e.g. BSA 68-83, 100, 120, BB92 and BB107 on the market), and different standards of the spindle have different requirements for dimensions and securing methods of the spindle. The lack of interchangeable parts on the existing auxiliary mid-drive system also causes problems of adaptability of the auxiliary mid-drive system for the spindle of different standards.

The prior art auxiliary mid-drive system used in bicycles cannot satisfy users' customization needs. Thus, it is still necessary to improve the auxiliary mid-drive system.

SUMMARY OF THE INVENTION

Aiming at the shortcomings of prior art, the invention provides a bicycle drive system configured to provide power assist for a pedal assembly of the bicycle, wherein the drive system comprises a drive unit comprising a housing, a motor unit having a stator, a rotor and an output shaft and accommodated in the housing, and a first stage deceleration unit having an input part connected to the output shaft of the motor unit to transmit a drive force from the motor unit to the first stage deceleration unit, and an output part; a mounting unit configured to secure and hold the drive unit on the pedal assembly; and a second stage deceleration unit arranged external to the drive unit and detachably mounted on the first stage deceleration unit for connection to the pedal assembly so that the drive force from the output part of the first stage deceleration unit is transferred to the chainrings of the pedal assembly, wherein the drive unit, the mounting unit and the second stage deceleration unit are each provided as a modular part and are detachably mounted relative to each other.

According to another aspect of the invention, the first stage deceleration unit is a planetary gear deceleration mechanism, and the output shaft of the motor unit and the input part of the first stage deceleration unit are coaxially arranged.

According to another aspect of the invention, the first stage deceleration unit comprises a sun gear attached to the output shaft of the motor unit and configured as the input part; a plurality of planetary gears surrounding the sun gear and engageable with the sun gear; a ring gear engageable with the plurality of planetary gears; a planetary gear carrier configured to hold the plurality of planetary gears; and a unidirectional transmission device provided between the planetary gear carrier and the output part.

According to another aspect of the invention, the housing of the drive unit comprises a housing portion adapted for housing the motor unit and a housing portion adapted for housing the first stage deceleration unit, which are detachably connected to each other.

According to another aspect of the invention, the second stage deceleration unit is configured as a deceleration mechanism selected from at least one of a chain deceleration mechanism, a belt deceleration mechanism and a gear deceleration mechanism. Preferably, the deceleration mechanism comprises a first transmission wheel mounted to the output part of the first stage deceleration unit and a second transmission wheel mounted to a spindle of the pedal assembly via the unidirectional transmission device.

According to another aspect of the invention, the system further comprises a control unit electrically connected with the motor unit and having a separate housing, and the control unit being provided as a modular part that is detachably mounted on the mounting unit.

According to another aspect of the invention, the mounting unit comprises a pair of support plates arranged in a spaced apart manner and having a first mounting part and a second mounting part separated from each other by a predetermined distance, the first mounting part being fixed on the spindle of the pedal assembly, the second mounting part being attached to two opposite ends of the drive unit so that the drive unit is arranged away from the spindle after the bicycle drive system is mounted in place on the bicycle.

According to another aspect of the invention, the system further comprises a cadence sensor comprising a magnetic ring mounted to the pedal assembly and configured to rotate together with rotation of a crank of the pedal assembly, and a sensor element adjoining the magnetic ring and being held on the mounting unit to sense the rotation of the magnetic ring, and the cadence sensor being connected to the control unit of the bicycle drive system.

According to another aspect of the invention, the system further comprises a torque sensor that comprises a strain sleeve provided on the pedal assembly to measure a force exerted on the pedal assembly, and the torque sensor is connected to the control unit of the bicycle drive system.

Preferably, the strain sleeve is mounted on a spindle core of the spindle of the pedal assembly and is connected to the unidirectional transmission device provided on the second transmission wheel of the second stage deceleration unit.

Moreover, the invention further provides an auxiliary drive kit for bicycles comprising a drive unit comprising a housing, a motor unit having a stator, a rotor and an output shaft and accommodated in the housing and a first stage deceleration unit having an input part connected coaxially to the output shaft of the motor unit to transmit a drive force from the motor unit to the first stage deceleration unit in the housing, and an output part; a mounting unit configured to secure and hold the motor unit and the first stage deceleration unit on a bicycle body of the bicycle, the mounting unit comprising a pair of or multiple pairs of support plates having different spacings and/or a selection of extension lengths; and a second stage deceleration unit arranged external to the drive unit and detachably mounted on the first stage deceleration unit for connection to the pedal assembly, and configured to transfer a drive force from the output part of the first stage deceleration unit to the chainrings of the pedal assembly, and the second stage deceleration unit further comprising a transmission wheel set having a selection of deceleration ratios. The multiple pairs of support plates of the mounting unit secured to the pedal assembly, particularly the multiple pairs of support plates having the first mounting parts of different spacings allows to select suitable support plates according to the structure of the bicycle body and the requirement for a mounting position.

Furthermore, the mounting unit can further comprise a shim provided between the support plate and the drive unit for adjusting the spacing to adapt for different models of spindle. Alternatively, the mounting unit may comprise an adapter for different models of spindle.

The bicycle drive system according to the invention provides a modularized structure, which enables customers to flexibly customize respective structural units according to the structure of a bicycle to which the structural units are to be mounted.

The drive unit of the bicycle drive system according to the invention integrates a high-power motor unit and a first stage deceleration unit having the unidirectional transmission device, and is capable of increasing the safety of the drive unit when high-power output occurs. The entire drive unit has a compact structure and is easy to mount.

The mounting unit allows for arrangement of the drive unit of the bicycle drive system above the pedal assembly and within the region defined by the triangular frame of the bicycle body in a manner that the drive unit stays away from the ground with a sufficient ground clearance and without scratching issue.

The bicycle auxiliary drive unit of the invention further comprises an independent control unit, and has various types of sensor adaption to enable customization of control needs.

The auxiliary drive kit for bicycles according to the invention comprises a modularized mounting unit and a modularized second stage deceleration unit, and therefore provides the possibility of power alteration in various models of bicycle on the market to satisfy needs for power customization.

BRIEF DESCRIPTION OF THE DRAWINGS

Hereinafter, preferred embodiments according to the invention will be described in detail with reference to the accompanying drawings, wherein:

FIG. 6 shows a schematic view of a bicycle drive system mounted to a triangular frame of the bicycle according to a preferred embodiment of the invention;

FIG. 7A shows a perspective view of the bicycle drive system with a cadence sensor according to a preferred embodiment of the invention;

FIG. 7B shows an enlarged view of details of the cadence sensor shown in FIG. 7A according to the preferred embodiment of the invention;

LIST OF REFERENCE NUMBERS

Figures 1, 2:
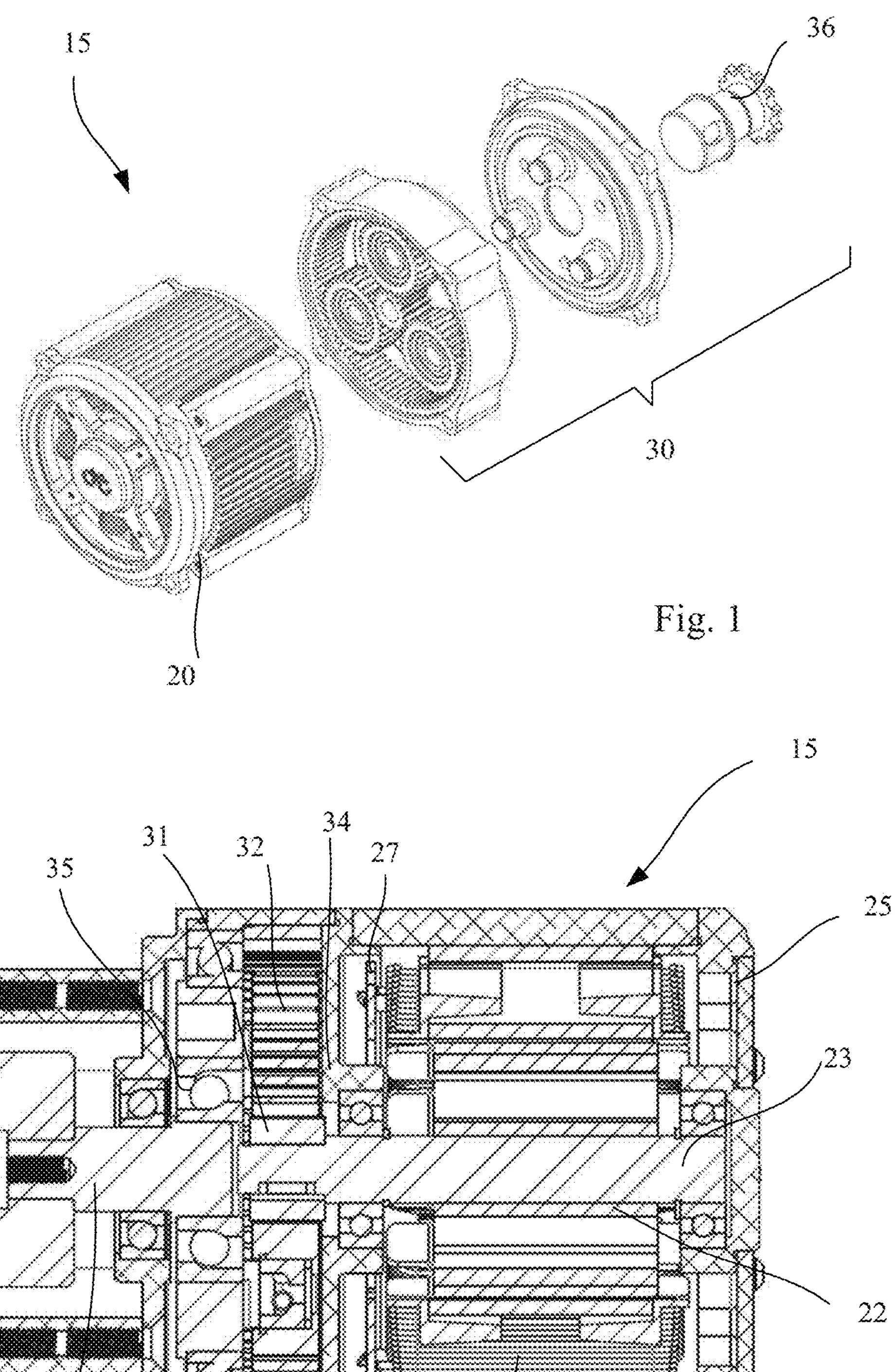
FIG. 1 shows an exploded perspective view of a drive unit according to a preferred embodiment of the invention.
FIG. 2 shows a sectional view of the drive unit of according to the preferred embodiment of the invention, wherein the drive unit comprises a motor unit and a first stage deceleration unit.

10 Drive system
15 Drive unit
20 Motor unit
21 Stator
22 Rotor
23 Rotation shaft
24 Motor unit housing portion
25 End cover
27 PCB
28 Coil
30 First stage deceleration unit
31 Sun gear
32 Planetary gear
33 Ring gear
34 Planetary gear carrier
35 Unidirectional transmission device
36 Output shaft
37 Housing
38 Large bearing
40, 40' Second stage deceleration unit
41 Pinion gear
42 Bull gear
41' Small sprocket
42' Large sprocket
43' Chain
46 Roller
47 Spring
48 Unidirectional transmission device
50 Mounting unit
511, 512, 513, 514, 515, 516 Support plates
60 Control unit
65 Cadence sensor
651 Magnetic ring
652 Sensor element
68 Torque sensor
681 Strain sleeve
70 Bicycle body

80 Pedal assembly
81 Crank
82 Chainring
83 Spindle
831 Spindle core
832 Spindle bowl
833 Tension nut

DETAILED DESCRIPTION OF THE INVENTION

The invention will be further described below in conjunction with the specific embodiments and the drawings. More details are set forth in the following description for better understanding of the invention, although it is apparent that the invention may be embodied in various manners other than those described herein. Those skilled in the art may make extension and deduction depending on the practical application situations without departing from the spirit of the invention. Thus, the scope of the invention is not intended to be limited by the contents of the specific embodiments.

A common power component in a bicycle is a pedal assembly 80. The pedal assembly 80 usually comprises a pedal, crank 81, chainrings 82 and a spindle 83 (which is also called a BB spindle) mounted on a mounting part of a bottom bracket of the bicycle. The pedaling of a rider drives the crank 81 and the chainrings 82 to rotate. The rotation of the chainrings 82 is transferred through a chain to the rear wheel of the bicycle.

FIG. 6 schematically shows a mid-drive system 10, which is mounted on the bicycle frame, according to a preferred embodiment of the invention. The mid-drive system 10 is arranged adjacent to the bicycle pedal assembly 80 to provide the auxiliary drive for the pedal assembly 80, particularly for the chainrings 82, to save physical strength of the rider.

In particular, the bicycle drive system 10 mainly comprises a drive unit 15, a second stage deceleration unit 40, a mounting unit 50 and a control unit 60, all of which are each provided as a modular part, enabling a user to appropriately select among these functional units according to the structure of the bicycle and actual needs, and integrally mount them on the bicycle. In the system 10 of the invention, the modularization of the units particularly means that each unit of the drive system 10 is configured as a structural module that can be separated, individually replaced and mounted relative to each other, and each unit can be modified and designed individually for customized needs.

FIG. 1 and FIG. 2 respectively show a perspective view and a sectional view of the drive unit 15 of the auxiliary drive for bicycles according to a preferred embodiment of the invention. The drive unit 15 further comprises a motor unit 20 and a first stage deceleration unit 30. Preferably, the motor unit 20 and the first stage deceleration unit 30 are coaxially integrated and accommodated in a housing of the drive unit 15 so as to form a modularized drive unit 15.

In a preferred embodiment of the drive unit 15, the motor unit is an inner rotor brushless motor. The motor unit 20 comprises a substantially cylindrical housing portion 24, a stator 21 fixed at the housing portion 24, a rotation shaft 23 extending along a rotation axis and a rotor 22 mounted to the rotation shaft 23 and arranged opposite the stator 21. The stator 21 comprises a plurality of stator teeth, each of which is wound with a coil 28. To prevent dislodgement of a magnet of the rotor 22 in the course of high-speed rotation, the magnet should be securely fixed to the rotor 22 so that the motor unit 20 according to the invention is able to achieve high-power output. For instance, in one embodiment, the magnet may be glued on the rotor with an adhesive. In another embodiment, the magnet may be attached to the rotor 22 by formfitting of a dovetail groove.

In a preferred embodiment, the housing portion 24 comprises a cylindrical wall and an end cover 25 on one side of the cylindrical wall, both of which are detachably connected via a fastener. In addition, as shown in FIG. 2, the outer surface of the cylindrical wall of the motor unit 20 has a plurality of radiating fins integrally formed thereon. Normally, the cylindrical wall of the housing portion 24 is made from a metallic material to facilitate heat dissipation of the motor unit 20. Preferably, the housing portion 24 is made from an aluminum alloy material. In a preferred embodiment, the end cover 25 is made from a transparent material. Examples of the transparent material include steel glass or a hard transparent resin material. The stator 21 and the rotor 22 inside the motor unit 20 are provided in the vicinity of the end cover 25 to make the stator 21 and the rotor 22 visible from outside for checking the operating condition of the motor.

Moreover, a PCB 27 useful for controlling the operation of the motor unit 20 is arranged inside the motor unit 20 at one end opposite the transparent end cover 25. In order to connect the motor unit 20 to the separate control unit 60 of the drive system 10, a control line (not shown) is led out of the housing portion 24 from the top of the PCB 27.

Advantageously, a heat conducting sealant may be used to seal the interior of the motor unit 20. In particular, a static portion in the motor unit 20, where the stator 21, the coil 28 and the PCB 27 are arranged, is hermetically filled with the heat conducting sealant. In this way, heat of the motor unit 20 generated in the course of operation can be dissipated through the radiating fins to the ambient environment, which not only can increase the reliability of the operation of the motor unit 20, but also ensure that the interior of the motor unit 20 is protected from external water and moisture.

As shown in FIG. 1 and FIG. 2, the first stage deceleration unit 30 in the motor unit 15 adopts a planetary gear deceleration mechanism coaxially arranged with the motor unit 20, i.e. the output end of the rotation shaft 23 of the motor unit 20 and a rotation axis of the input part of the first stage deceleration unit 30 are arranged on a common axis. Preferably, a positioning member such as a positioning step is provided between the motor unit 20 and the first stage deceleration unit 30. The interaction with the positioning member ensures that the output end of the motor unit 20 and the input part of the first stage deceleration unit 30 keep staying coaxially.

Figure 3:
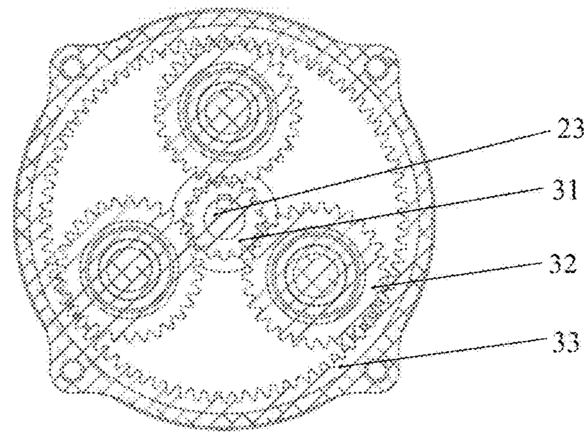
FIG. 3 shows a sectional view of the first stage deceleration unit according to the preferred embodiment of the invention.

In a preferred embodiment, the first stage deceleration unit 30 mainly comprises a sun gear 31, planetary gears 32, a ring gear 33, a planetary gear carrier 34, an output shaft 36 configured as an output part and a housing portion 37. As shown in FIG. 3, the sun gear 31 is connected to the output end of the rotation shaft 23 of the motor unit 20, for example via a splined-shaft connection. Three planetary gears 32 are held by the planetary gear carrier 34, are arranged in a spaced-apart manner around the sun gear 31 and engage with the sun gear 31. One ring gear 33 is provided around the outer circumference of the planetary gears 32. This ring gear 33 is secured to the housing portion 37 of the first deceleration unit 30 so that the ring gear 33 on the outer circumference is engageable with each of the planetary gears 32.

In a preferred embodiment, a large bearing 38 is provided on the outer circumference of the planetary gear carrier 34 and connected to the housing portion 37 of the deceleration unit 30 to enable the planetary gear carrier 34 to rotate inside the housing portion 37.

Inside the interior of the planetary gear carrier 34, there is a unidirectional transmission device 35 comprising an inner ring connected to an output shaft 36, and an outer ring. The unidirectional transmission device 35 and the output shaft 36 are connected to each other for example in a manner of press-fitting or splined-shaft connection so as to realize restrictions on circumferential movement. It is particularly beneficial to the bicycle mid-drive system 10 to integrate one unidirectional transmission device 35 into the first stage deceleration unit 30. On one hand, the unidirectional transmission device 35 can prevent the output shaft 36 of the first stage deceleration unit 30 to drive the motor unit in reverse, because a reverse rotation force exerted on the output shaft 36 of the first stage deceleration unit 30 would cause the transmission device 35 to idle, thereby the rotation force cannot be transferred to the motor unit 20. On the other hand, the unidirectional transmission device 35 can protect the rider in the event that undesirable rotation of the motor unit 20 occurs, that is to say, when the motor unit 20 rotates in the direction opposite to the drive direction, the unidirectional transmission device 35 will also idle, causing a failure in transferring the reverse drive force to the output shaft 36 of the first stage deceleration unit. Preferably, a positioning step is formed between the front end cover of the first stage deceleration unit 30 and the housing portion 37 of the first stage deceleration unit 30, thereby by means of the positioning effect of the positioning step, it is ensured that the output shaft 36, the motor unit 20 and the deceleration unit 30 are arranged coaxially.

In the first stage deceleration unit 30 according to a preferred embodiment, the large bearing, the planetary gear carrier 34, the unidirectional transmission device 35 and the output shaft 36 are connected to form a partition, so that the space in which the sun gear 31, the planetary gear 32 and the ring gear 33 are located is separated hermetically from the space in which the portion of the output shaft 36 extending outward is located. In this way, dust and water will not enter the spaces in which various gear components of the deceleration unit 30 are located; thereby the lubricant lubricating various gear components can be prevented from being contaminated.

In a preferred embodiment, the first stage deceleration unit 30 has a preset deceleration ratio in the range of 3:1 to 10:1. Various gear components in the deceleration unit 30 all adopt straight teeth. However, it should be understood that teeth in other shapes can also be used instead.

As shown in FIG. 2, in the preferred embodiment according to the invention, the motor unit 20 and the first stage deceleration unit 30 are integrated as a unitary drive unit 15, thereby providing a compact structure. The cylindrical wall of the motor unit 20 has an outer diameter that is substantially the same as that of the first stage deceleration unit 30 substantially the same. The motor unit 20 and the first stage deceleration unit 30 are preferably separated from each other by a partition wall. The rotation shaft 23 of the first stage deceleration unit 30 extends through a hole formed on the partition wall into the housing portion of the first stage deceleration unit 30. As shown in FIG. 1, on both the cylindrical wall and the end caps on the both sides of the drive unit 15 are provided fasteners through which bolts pass to fasten various components inside the housing portion. The unitary drive unit 15 can be mounted as a module on the bicycle.

Furthermore, a second stage deceleration unit 40, 40' is provided between the drive unit 15 and the bicycle pedal assembly 80 in a manner to transmit the drive force between two parallel rotation axes in the direction perpendicular to a plane comprising the rotation axis of a spindle 83 of the pedal assembly 80. In particular, the second stage deceleration unit 40, 40' according to the invention may be implanted in various forms.

Figure 4:
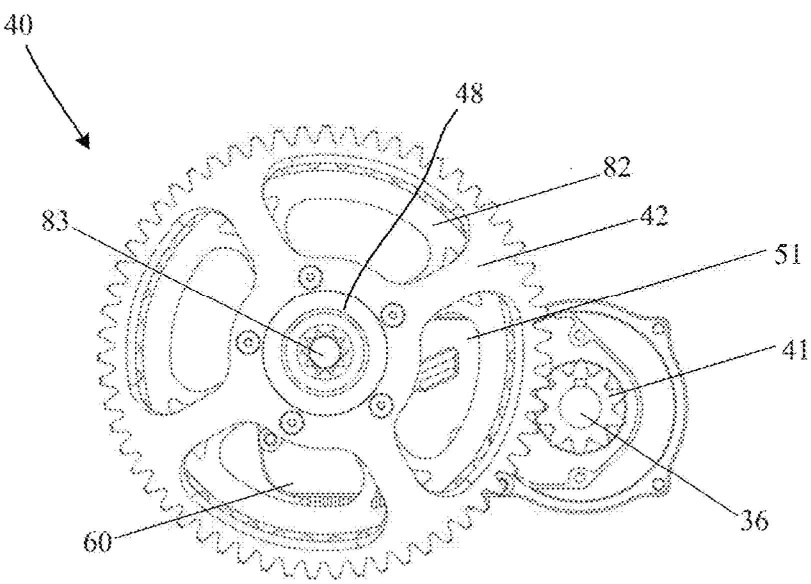
FIG. 4 shows a sectional view of a second stage deceleration unit according to a preferred embodiment of the invention.

FIG. 4 shows a second stage deceleration unit 40 configured as a gear type deceleration mechanism. As shown in FIG. 4, this second stage deceleration unit comprises a pinion gear 41 mounted on the output shaft 36 of the first stage deceleration unit 30 and a bull gear 42 fixed on the chainrings 82 of the bicycle. The pinion gear 41 can be fixed to the output shaft of the first stage deceleration unit 30 by means of a spline connection (not shown), and the bull gear 42 is sleeved on the spindle 83 by means of the unidirectional transmission device 48, and also detachably fixed to the chainrings 82 of the bicycle. The engagement of the pinion gear 41 and the bull gear 42 allows for transfer of the drive force from the output shaft 36 of the first stage deceleration unit 30 to the chainrings 82 of the bicycle to directly provide the auxiliary drive for the bicycle or form an amplified force together with the pedaling force of the rider to provide the drive for the bicycle. The gear ratio of the bull gear 42 to the pinion gear 41 of the second stage deceleration unit can be set in the range of 3:1 to 10:1, thereby providing respective deceleration ratios.

Figure 5A:
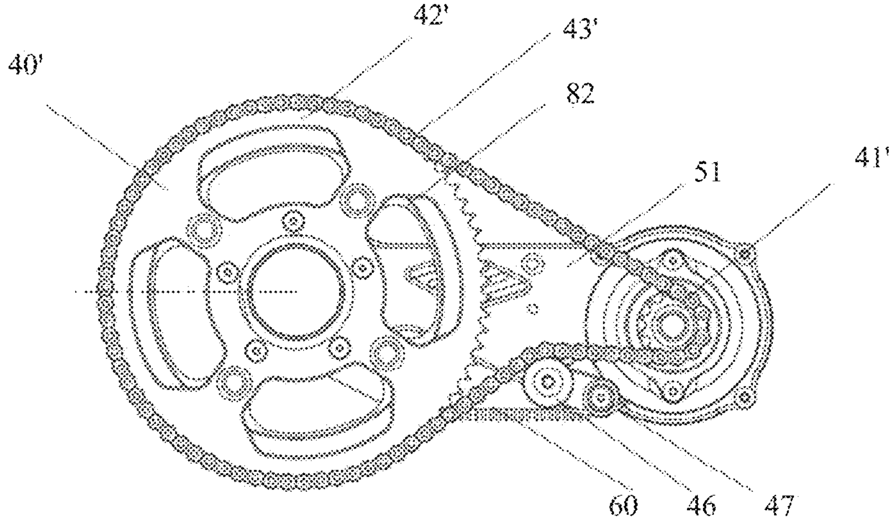
FIG. 5A to FIG. 5C respectively show schematic views of a second stage deceleration unit according to another preferred embodiment of the invention.

FIG. 5A shows a second stage deceleration unit 40' configured as a chain type deceleration mechanism. This chain second stage deceleration unit 40' comprises a small sprocket 41' mounted on the output shaft 36 of the first stage deceleration unit 30, a large sprocket 42' mounted at the pedal assembly and a chain 43' connecting the two sprockets 41', 42'. Moreover, the large sprocket 42' has an inner circumference connected to the spindle 83 via the unidirectional transmission device so that the drive force of the drive unit 15 would not cause the crank 81 to rotate, thereby the rider is protected from potential danger.

The second stage deceleration unit 40' having a chain deceleration mechanism can further comprise a tensioner for providing the chain 43' with a proper tension while the chain 43' is trained. As shown in FIG. 5A, the tensioner mainly comprises a roller 46 and a spring 47 attached to the roller 46 which is rendered to abut against the chain 43' to tension the chain 43' under the elastic force of the spring 47. The deceleration unit 40' of chain type provides the flexibility of mounting the drive unit 15 in terms of its mounting position.

Figures 5B, 5C:
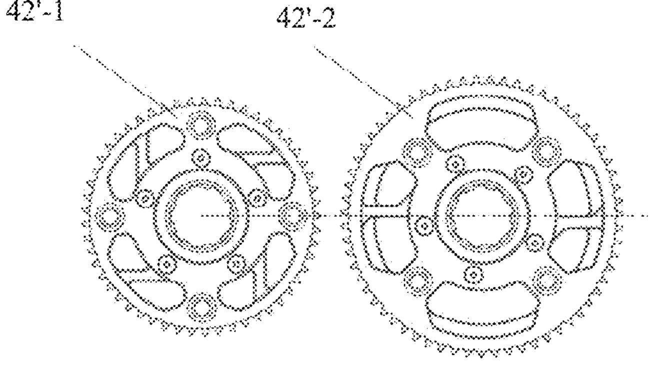

In the preferred embodiment, the second stage deceleration unit of chain type comprises a plurality of large sprockets of different dimensions as optional accessories. Two sprockets 42'-1 and 42'-2 of different dimensions are shown in FIG. 5B and FIG. 5C, which can provide different output torques and deceleration ratios. For instance, a mountain bike may adopt the larger sprocket 42'-1 for a higher torque output and for prevention of damage to the sprocket. Apart from the above, the second stage deceleration unit 40 of chain type is able to provide the flexibility of mounting the drive unit 15 in terms of its mounting position.

In one preferred embodiment according to the invention, the first stage deceleration unit 30 and the second stage deceleration unit 40, 40' are used in combination to achieve a total deceleration ratio in the range of 9:1 to 100:1.

Furthermore, in an alternative embodiment, the second stage deceleration unit can also adopt a belt type deceleration mechanism, which is arranged in a similar manner to the chain type deceleration mechanism and is not described here again.

The drive system 10 according to the preferred embodiment of the invention further comprises a mounting unit 50 provided as a modular part for mounting the drive unit 15 and the second stage deceleration unit 40, 40' on the bicycle body 70, and this mounting unit module is adaptable for spindle 83 of different specifications. Preferably, the mounting unit 50 comprises a pair of support plates 51, between which an additional support rod connecting inner surfaces of the two support plates 51. Each of the support plates 51 has a mounting part at one end. The two mounting parts are respectively connected to the two opposite ends of the drive unit 15, i.e. respectively attached to the transparent end cover 25 of the motor unit 20 and the end cover of the first stage deceleration unit 30 opposite to the transparent end cover 25. After the mounting unit 50 is held to the end of the mounting unit 15 in place, the output shaft 36 of the first stage deceleration unit 30 can protrude beyond the outer surface of the support plate 51 such that the pinion gear 41 or the small sprocket 41' is located external to the outer surface of the support plate 51 after the second stage deceleration unit 40, 40' is mounted in position.

The support plate 51 is normally made from a rigid material, such as metallic materials. The material and the thickness of the support plate are selected in such a way that the rigidity of the support plate is sufficient to hold the weight of the drive unit 15. When the drive system 10 according to the invention is mounted on the bicycle, as shown in FIG. 6, the support plate 51 extends upward from the position of the spindle of the pedal assembly 80 to hold the drive unit 15 above the pedal assembly 80. In particular, the drive unit 15 can be held within a space defined by the triangular frame of the bicycle body 70 to lift the entire drive unit 15 away from the ground. This solves the problem of the mid-drive motor prone to scratching the ground that may occur in prior art.

Figure 9A:
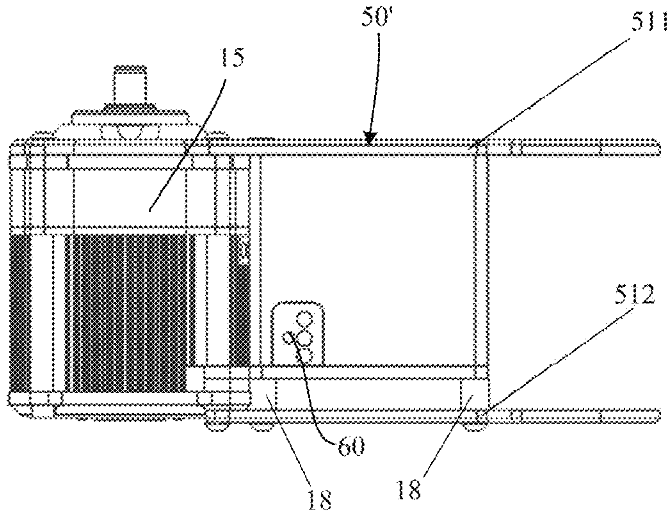
FIG. 9A to FIG. 9C respectively show schematic views of bicycle drive systems with different support plates according to preferred embodiments of the invention.
Figure 9B:
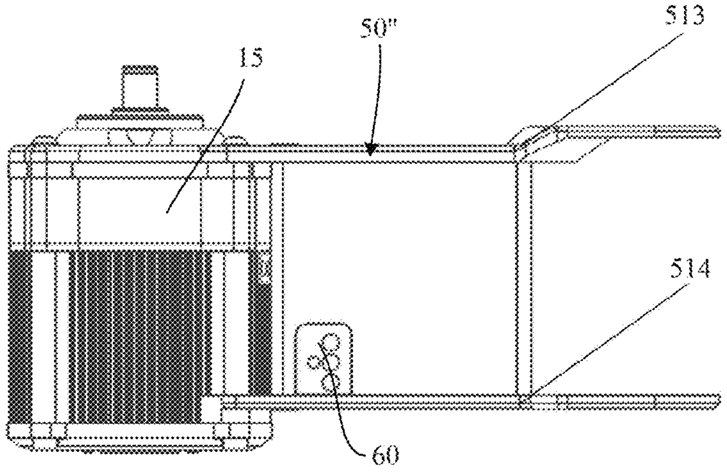
Figure 9C:
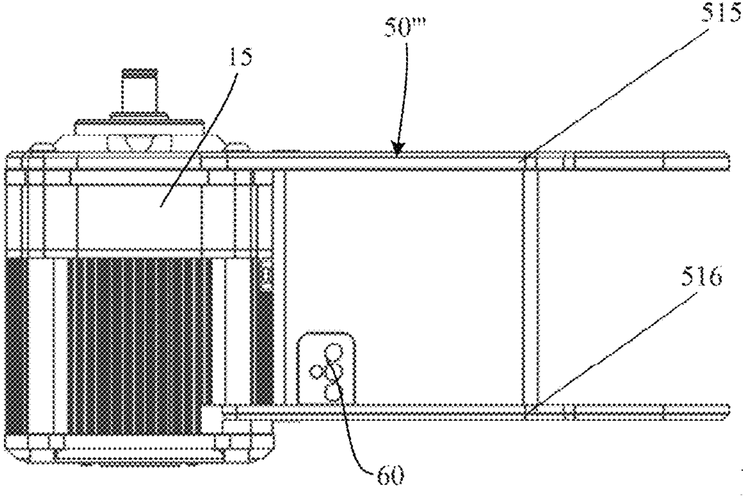

To adapt for different types of bicycle and different second stage deceleration units 40, 40', the mounting unit 50 of the drive system 10 of the invention comprises support plates in different forms, as those shown in FIG. 9A, FIG. 9B and FIG. 9C. FIG. 9A shows the first type mounting unit 50' having two planar support plates 511 and 512 arranged in parallel. These two support plates 511 and 512 have a substantially same extension length. The spacing between the support plates 511 and 512 at the drive unit 15 is equal to the spacing between the support plates 511 and 512 at the spindle 83, which is suitable for the spindle having a longer axial length. FIG. 9B shows the second type mounting unit 50" comprising a support plate 513 carried on one side of the first stage deceleration unit 30 and having an offset part, and a support plate 514 extending in a planar manner from a position offset inward relative to the outer surface of the transparent end cover 25 of the drive unit 15.

FIG. 9C shows a third type mounting unit 50''' comprising a support plate 515 carried on one side of the first stage deceleration unit 30 and extending in a planar manner, and a support plate 516 extending in a planar manner from a position offset inward relative to the outer surface of the transparent end cover 25 of the drive unit 15, so that the two support plates 515, 516 defines a smaller spacing at the spindle 83, which is suitable for the spindle having a shorter axial length.

Selection of the above-mentioned support plates is flexible depending on mounting conditions, so that the auxiliary drive system according to the invention can be mounted on various types of bicycle. In order to adapt for certain models of spindle, the respective spacings between the support plates 511 and 512, between the support plates 513 and 514 and between the support plates 515 and 516 can be adjusted, and preferably a shim 18 is provided between the support plate 511, 513, 515 and the end cover of the drive unit 15 to adjust the spacing therebetween. One or more shims 18 with different shim thicknesses may be used. Alternatively, using an adaptor is also possible for mounting different models of spindle.

Figure 8A:
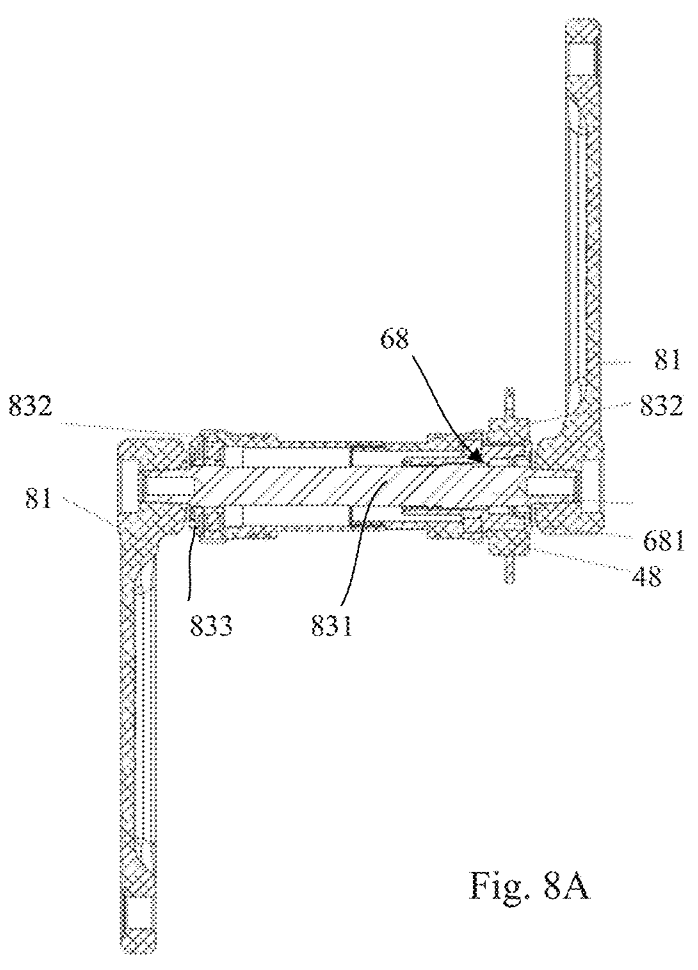
FIG. 8A shows a sectional view of the bicycle drive system with a torque sensor according to a preferred embodiment of the invention.

In a preferred embodiment, mounting the support plates 511 and 512 such as those shown in FIG. 9A on the pedal assembly shown in FIG. 8A and mounting the drive unit 15 on the support plates comprise step 1 of securing the drive unit 15 on the respective ends of the support plates 511 and 512; step 2 of aligning the respective opposite ends of the support plates 511 and 512 with the spindle 83 of the pedal assembly 80, and inserting and threadably fastening the spindle bowl 832, which is normally formed by two parts, to both sides of the spindle; and step 3 of inserting the spindle core 831 into the spindle bowl 832 and locking the spindle core 831 the spindle bowl 832 by a tension nut 833 to mount the support plates 511 and 512 on the spindle 83. The rider is then able to orient the support plates 511 and 512 in the frame of the bicycle body, if desirable, with the aid of a strap or a suspension (not shown).

Figure 10A:
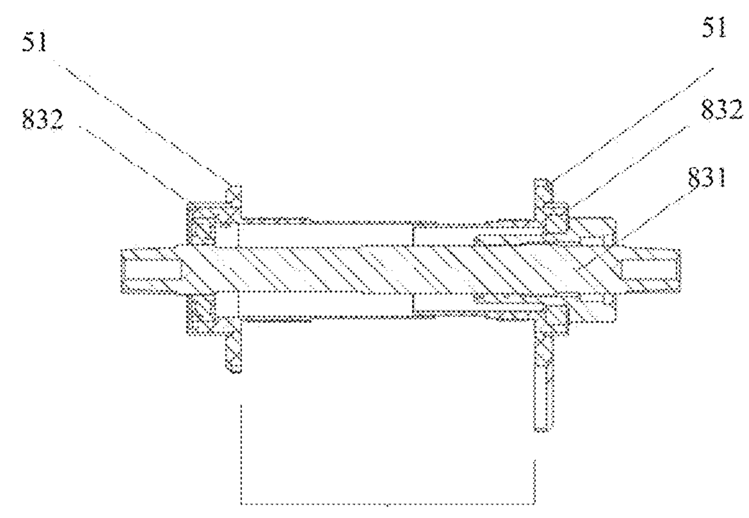
FIG. 10A to FIG. 10C respectively show sectional views of the spindle and a carrier cover that are adaptable for different support plates and mounted to the bicycle crank.
Figure 10B:
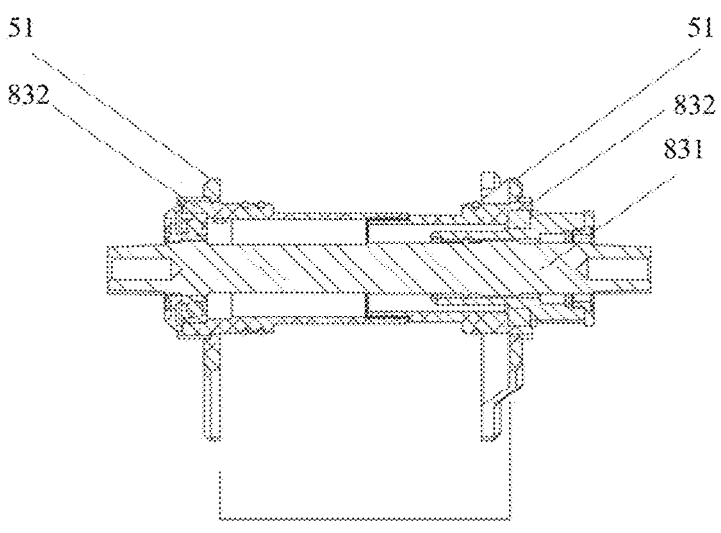
Figure 10C:
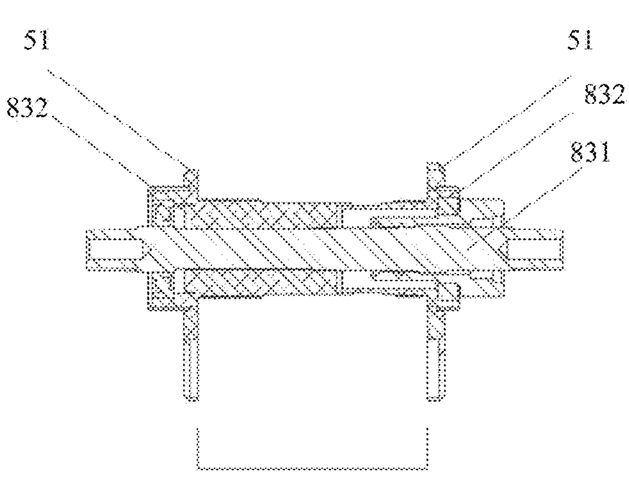

FIG. 10A to FIG. 10C respectively show the spindles 83 of the pedal assembly 80 of three different structures, which spindles are respectively corresponding to the mounting units of FIG. 9A to FIG. 9C and have different axial lengths. The spindle 83 has a spindle core 831 and a pair of spindle bowls 832. It is very convenient to attach or detach the spindle 831 to or from the bicycle drive system 10 according to the invention by unscrewing the fastener of fastening the spindle 83, followed by pulling the spindle 83 out from the bicycle body 70, inserting a desirable spindle core 831 and a pair of spindle bowls 832 associated with the desirable spindle core, and engaging the spindle bowls 832 into the corresponding support plates of the mounting unit 50 shown in one of FIG. 9A to FIG. 9C to secure the drive unit 15 in place.

As described in the above embodiments, the mid-drive system 10 according to the invention can be mounted to spindles having different lengths and different diameters. For example, the mounting unit 50 according to the invention is adaptable for the spindle having a length in the range of 68 mm to 120 mm and a diameter in the range of 36 mm to 45 mm.

Furthermore, it is illustrated in FIG. 7A that the mounting unit 50 is further provided with a mounting part for the control unit 60, which, for instance, is formed on one of the support plates 51 adjacent to the drive unit 15, through, for instance, fixation of the control unit on the support plate 51 with a bolt. According to a preferred embodiment of the invention, the control unit 60 is provided as a modular part comprising a separate housing and a circuit board accommodated in the housing with leading protruding from the circuit board beyond the housing of the control unit 60 for connection with the PCB 27 of the motor unit 20 to enable the control unit 60 to take control of the motor unit 20.

In an alternative embodiment, according to the structure per se of a bicycle and individual needs of users, the control unit can also be mounted at a position other than on the support plates by means of extended leading wires. For example, the control unit may be mounted directly on the frame of the bicycle.

Preferably, the housing of the control unit 60 is filled with an electrical insulating sealant to seal the interior of the housing for the sake of preventing a short-circuit connection of electrical components placed in the interior of the control unit 60 and the housing of the control unit or the mounting unit 50. In addition, the housing of the control unit 60 is preferably made from a metallic material, and the insulating sealant is thermally conductive to assist dissipation of heat generated from the interior of the control unit 60.

Additionally or alternatively, the control unit 60 can also be provided with a radiator (not shown) arranged on the housing of the control unit 60 to dissipate the heat to the ambient environment.

According to a preferred embodiment of the invention, the control unit 60 is connected to a sensor device located at the pedal assembly 80 for collection of signals indicating running states of the bicycle to control the motor unit 20.

In a preferred embodiment, the sensor device comprises a cadence sensor 65 for collecting a rotation speed of the bicycle crank 81. As shown in FIG. 7A and FIG. 7B, the cadence sensor 65 comprises a magnetic ring 651 and a sensor element 652, which are closely arranged. Specifically, the magnetic ring 651 is mounted at the pedal assembly 80 and rotates together with rotation of the crank 81, and the sensor element 652 adjoins the magnetic ring 651 and is held on the mounting unit 50 to sense the rotation of the magnetic ring 651. The periphery of the magnetic ring 651 has a plurality of magnetic poles. The magnetic ring 651 is configured to rotate as the bicycle crank 81 rotates, such that the sensor element 652 counts and records the number of the magnetic poles 651 that are caused to rotate by the rotation of the magnetic ring 651 to pass the sensor element 652. The sensor element 652 sends the number of the passing magnetic poles 651 recorded to the control unit 60 where rotation time and rotation speed of the crank 81 are calculated. When the speed reaches a predetermined value, the drive system 10 can intervene the drive operation to provide power assist for the pedal assembly 80. In addition, the cadence sensor 65 is also configured to detect a rotation direction of the crank 81. The control unit 60 is configured in such a way that the drive system 10 is not be activated when the sensor device detects the reverse rotation of the crank 81, which provides safety protection for the auxiliary drive system 10.

Figure 8B:
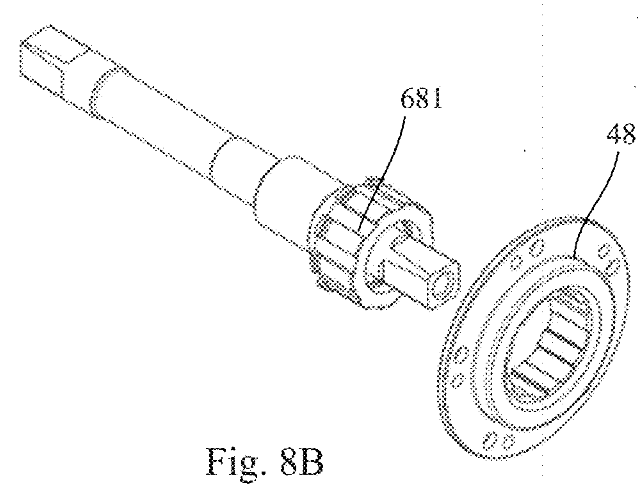
FIG. 8B shows a perspective view of a crank spindle of the bicycle drive system according to the preferred embodiment of the invention.

Preferably, the sensor device of the control unit 60 may adopt a torque sensor 68 as shown in FIG. 8A and FIG. 8B. In a preferred embodiment, the torque sensor 68 mainly comprises a strain sleeve 681 sleeved on the spindle core 831 of the spindle 83. The strain sleeve 681 has a plurality of micro-sensors capable of detecting a small amount of torque occurring in the body of the strain sleeve 681. The power arising from the pedaling of the rider is transmitted through the crank 81 and the spindle core 831 of the spindle 83 to the strain sleeve 681. In addition, the strain sleeve 681 is in spline teeth connection, for example, to the unidirectional transmission device 48 of the second stage deceleration unit. When the bicycle is running, the strain sleeve 681 rotates to come into contact with the static unidirectional transmission device 48, thereby allowing the torque sensor 68 to measure the pedaling force applied by the rider to the pedal assembly 80, and generate and deliver a signal to the control unit 60, which receives and processes the signal to control the drive unit 15 to provide power assist in the case that criteria are met.

The bicycle drive system 10 according to the invention provides a modularized structure, which allows riders for customized selection of the mounting unit 50, the second stage deceleration unit 40, 40', and the drive unit 15 comprising the motor unit 20 and the first stage deceleration unit 30 as desirable for mounting on the bicycle body 70 according to their own bicycle, providing power assist for the chainrings 82 of the pedal assembly 80.

In the preferred embodiment mentioned above, the motor unit 20 is an inner rotor brushless motor. In an alternative embodiment, an outer rotor brushless motor is possible for the invention, and an outer rotor brushless motor and a planetary gear deceleration mechanism are integrated to form a drive unit module.

The drive system of the invention has two stage deceleration units comprising the first stage deceleration unit 30 integral with the motor unit 20, and the second stage deceleration unit 40 external to the drive unit 15 and installable on the bicycle body 70. A wide selection of sprockets and gears allows the customers to customize an optimal output torque of the drive unit 15.

Advantageously, the bicycle drive system 10 according to the invention is provided in the form of a kit. Specifically, the mounting unit 50 of the system may comprise a pair of support plates or selectable multiple pairs of support plates, such as support plates of 511 and 512, support plates of 513 and 514, and support plates 515 and 516 shown in FIG. 9A to FIG. 9C respectively. In a preferred embodiment, the multiple pairs of support plates have different extension lengths different relative to each other.

Alternatively and preferably, the mounting unit 50 in the kit may have one or more shims 18 to be provided between the drive unit 15 and the mounting part of the support plate to adjust the spacing between the pair of support plates to adapt for different models of spindle. Additionally, the mounting unit 50 may comprise an adaptor for different models of spindle.

In another aspect, the second stage deceleration unit of the bicycle drive kit may comprise a transmission wheel set having a selection of deceleration ratios, for example those transmission wheels shown in FIG. 5B and FIG. 5C, to allow maximum customizability of the drive system.

The drive system 10 according to the invention may aid in upgrading power assist for an existing bicycle to provide power assist for the rider. However, it should be understood that in other alternative embodiments, the drive system 10 may also be used alone to power the bicycle.

The invention has been disclosed above with preferred embodiments, but they are not intended to limit the invention. Any person skilled in the art can make possible changes and alterations without departing from the spirit and scope of the invention. Therefore, any alterations, equivalent changes and modifications made to the foregoing embodiments according to the technical substance of the invention without departing from the content of the technical solution of the invention should fall within the protection scope defined by the claims of the invention.

What is claimed is:

1. A bicycle drive system configured to provide power for a pedal assembly of a bicycle, comprising:

- a drive unit comprising a housing, end caps at opposite sides of the drive unit, a motor unit having a stator, a rotor and an output shaft and accommodated in the housing, and a first stage deceleration unit having an input part connected to the output shaft of the motor unit to transmit a drive force from the motor unit to the first stage deceleration unit in the housing, and an output part;
- a mounting unit configured to secure and hold the drive unit on the pedal assembly; and a second stage deceleration unit arranged external to the drive unit and detachably mounted on the first stage deceleration unit for connection to the pedal assembly so that the drive force from the output part of the first stage deceleration unit is transferred to chainrings of the pedal assembly, wherein the drive unit, the mounting unit and the second stage deceleration unit are each provided as a modular part and are detachably mounted relative to each other, wherein the mounting unit includes a pair of spaced-apart support plates extending upward from a spindle of the pedal assembly, the mounting unit being configured to hold the drive unit selectively within a space defined by a triangular frame of the bicycle or outside of the space;

wherein the mounting unit further comprises an adaptor disposed between the support plates and the drive unit, the adaptor being configured to adjust a spacing between the support plates and the drive unit to adapt for an axial length of the spindle;

wherein the motor unit and the first stage deceleration unit each have a cylindrical wall of substantially the same outer diameter and are separated by a partition wall, an output shaft of the motor unit extending through a hole in the partition wall into a housing portion of the first stage deceleration unit, the cylindrical wall and the end caps are detachably connected by fasteners; and wherein the drive unit, the mounting unit, and the second stage deceleration unit are each provided in a modular manner and are detachably mountable relative to one another.

2. The bicycle drive system of claim 1, wherein the first stage deceleration unit is a planetary gear deceleration mechanism, and the output shaft of the motor unit and the input part of the first stage deceleration unit are coaxially arranged.

3. The bicycle drive system of claim 2, wherein the first stage deceleration unit comprises:

a sun gear attached to the output shaft of the motor unit and configured as the input part;

a plurality of planetary gears surrounding the sun gear and engageable with the sun gear;

a ring gear engageable with the plurality of planetary gears;

a planetary gear carrier configured to hold the plurality of planetary gears; and a unidirectional transmission device provided between the planetary gear carrier and the output part.

4. The bicycle drive system of claim 1, wherein the first stage deceleration unit comprises:

a sun gear attached to the output shaft of the motor unit and configured as the input part;

a plurality of planetary gears surrounding the sun gear and engageable with the sun gear;

a ring gear engageable with the plurality of planetary gears;

a planetary gear carrier configured to hold the plurality of planetary gears; and a unidirectional transmission device provided between the planetary gear carrier and the output part.

5. The bicycle drive system of claim 1, wherein the housing of the drive unit comprises a housing portion adapted for housing the motor unit and a housing portion adapted for housing the first stage deceleration unit, which are detachably connected to each other.

6. The bicycle drive system of claim 1, wherein the second stage deceleration unit is configured as a deceleration mechanism selected from at least one of a chain deceleration mechanism, a belt deceleration mechanism and a gear deceleration mechanism, and the deceleration mechanism comprising a first transmission wheel mounted to the output part of the first stage deceleration unit and a second transmission wheel mounted to a spindle of the pedal assembly via a unidirectional transmission device.

7. The bicycle drive system of claim 1, further comprising a control unit electrically connected with the motor unit and having a separate housing, and the control unit being provided as a modular part which is detachably mounted on the mounting unit.

8. The bicycle drive system of claim 1, wherein the support plate having a first mounting part and a second mounting part separated from each other by a predetermined distance, the first mounting part being fixed on a spindle of the pedal assembly, the second mounting part being attached to two opposite ends of the drive unit so that the drive unit is arranged away from the spindle after the bicycle drive system is mounted in place on the bicycle.

9. The bicycle drive system of claim 1, wherein the system further comprises a cadence sensor comprising a magnetic ring mounted to the pedal assembly and configured to rotate together with rotation of a crank of the pedal assembly, and a sensor element adjoining the magnetic ring and being held on the mounting unit to sense the rotation of the magnetic ring, and the cadence sensor being connected to a control unit of the bicycle drive system.

10. The bicycle drive system of claim 1, wherein the system further comprises a torque sensor which comprises a strain sleeve provided on the pedal assembly to measure a force exerted on the pedal assembly, and the torque sensor is connected to a control unit of the bicycle drive system.

11. The bicycle drive system of claim 10, wherein the strain sleeve is mounted on a spindle core of the spindle of the pedal assembly, and is connected to a unidirectional transmission device provided on a transmission wheel of the second stage deceleration unit.

12. A auxiliary drive kit for a pedal assembly of a bicycle, wherein the kit is provided as a modular part, the kit comprising:

a drive unit comprising a housing, end caps at opposite sides of the drive unit, a motor unit having a stator, a rotor and an output shaft and accommodated in the housing, and a first stage deceleration unit having an input part connected coaxially to the output shaft of the motor unit to transmit a drive force from the motor unit to the first stage deceleration unit in the housing, and an output part, and the first stage deceleration unit has an input part and an output part, the input part of the first stage deceleration unit being coaxially connected to an output shaft of the motor unit to transmit drive force from the motor unit to the first stage deceleration unit in the body;

a mounting unit configured to secure and hold the motor unit and the first stage deceleration unit on a bicycle body, the mounting unit comprising a pair of or multiple pairs of support plates, extending away from a spindle of the pedal assembly, having different spacings and/or a selection of extension lengths, wherein the mounting unit is configured to hold the drive unit selectively within a space defined by a triangular frame of the bicycle or outside of the space; and a second stage deceleration unit arranged external to the drive unit and detachably mounted on the first stage deceleration unit for connection to the pedal assembly, and configured to transfer a drive force from the output part of the first stage deceleration unit to chainrings of the pedal assembly, and the second stage deceleration unit comprising a transmission wheel set having a selection of deceleration ratios, wherein the mounting unit further comprises an adaptor disposed between the support plates and the drive unit, the adaptor being configured to adjust a spacing between the support plates and the drive unit to adapt for an axial length of the spindle;

wherein the motor unit and the first stage deceleration unit each have a cylindrical wall of substantially the same outer diameter and are separated by a partition wall, an output shaft of the motor unit extending through a hole in the partition wall into a housing portion of the first stage deceleration unit, the cylindrical wall and the end caps are detachably connected by fasteners; and wherein the drive unit, the mounting unit, and the second stage deceleration unit are each provided in a modular manner and are detachably mountable relative to one another.

13. The drive kit of claim 12, wherein the adaptor comprises one or more shims.

14. A bicycle drive system for mounting to a bottom bracket of a bicycle, comprising:

a drive unit including a housing which houses a motor unit and a first stage deceleration unit coupled coaxially to an output shaft of the motor unit;

a mounting unit configured to secure the drive unit to the bicycle; and a second stage deceleration unit external to the drive unit and operatively connected to a pedal assembly of the bicycle;

wherein the mounting unit comprises spaced-apart support plates extending away from the bottom bracket which houses a spindle of the pedal assembly, and an adaptor disposed between the support plates and the drive unit, the adaptor is configured to adjust a spacing between the support plates and the drive unit;

wherein the mounting unit is configured such that the spacing between the support plates is adjustable to adapt for different axial lengths of the spindle; and wherein the drive unit, the mounting unit, and the second stage deceleration unit are each modular components that are detachably mountable relative to one another by fasteners.

15. The bicycle drive system of claim 14, wherein the mounting unit is configured to hold the drive unit selectively within a space defined by a triangular frame of the bicycle or outside of the space.

16. The bicycle drive system of claim 14, wherein the motor unit and the first stage deceleration unit each have a cylindrical wall of substantially the same outer diameter, and a partition wall is formed between the motor unit and the first stage deceleration unit to hermetically separate the motor unit from the first stage deceleration unit.

17. The bicycle drive system of claim 16, wherein an output shaft of the motor unit extends through a hole in the partition wall into a housing portion of the first stage deceleration unit.

18. The bicycle drive system of claim 14, wherein the second stage deceleration unit is provided as a modular component external to the housing of the drive unit and detachably mountable relative to the drive unit and the pedal assembly.

19. The bicycle drive system of claim 18, wherein the second stage deceleration unit comprises a gear transmission operatively coupled to the pedal assembly.

* * * * *